(12) United States Patent
Dervidis et al.

(10) Patent No.: US 11,544,765 B1
(45) Date of Patent: Jan. 3, 2023

(54) ITEM SWAP FEATURE

(71) Applicant: Amazon Technologies, Inc., Seattle, WA (US)

(72) Inventors: Fodi Dervidis, Hemmant (AU); Jay L. Bailey, Brisbane (AU); Dennis Dugandzic, Windsor (AU)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 16/900,595

(22) Filed: Jun. 12, 2020

(51) Int. Cl.
*G06Q 30/00* (2012.01)
*G06Q 30/06* (2012.01)
*G06F 3/0484* (2022.01)
*G06F 16/9535* (2019.01)
*G06F 16/9538* (2019.01)
*G06Q 10/08* (2012.01)

(52) U.S. Cl.
CPC ....... *G06Q 30/0631* (2013.01); *G06F 3/0484* (2013.01); *G06F 16/9535* (2019.01); *G06F 16/9538* (2019.01); *G06Q 10/087* (2013.01); *G06Q 30/0627* (2013.01); *G06Q 30/0635* (2013.01); *G06Q 30/0643* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 10,162,868 B1 * | 12/2018 | Zappella | G06F 16/24578 |
| 10,417,605 B1 * | 9/2019 | Liu | G06Q 10/0838 |
| 10,679,268 B1 * | 6/2020 | Kochhar | G06Q 30/0635 |
| 11,106,751 B1 * | 8/2021 | Kadayam | G06F 16/9535 |
| 2013/0332291 A1 * | 12/2013 | Perez | G06Q 30/0623 705/14.73 |
| 2014/0214590 A1 * | 7/2014 | Argue | G06Q 30/0631 705/26.7 |
| 2017/0193586 A1 * | 7/2017 | Yuan | G06Q 30/0625 |
| 2021/0012281 A1 * | 1/2021 | Paquin | G06Q 10/0837 |

OTHER PUBLICATIONS

Help Center, "Adding instructions for specific items, replacements, or delivery", Instacart.com, dated Jun. 1, 2020. (Year: 2020).*
Instacart, "adding instructions for specific items, replacements, or delivery", instacart.com, dated Jun. 1, 2020. (Year: 2020).*

* cited by examiner

*Primary Examiner* — Mark A Fadok
(74) *Attorney, Agent, or Firm* — Kilpatrick Townsend & Stockton LLP

(57) ABSTRACT

Techniques for an item swap feature are described herein. A user interface may be presented where the user interface includes a plurality of user interface elements. A first area of the user interface may include one or more user interface elements which correspond to item information for an item. A second area of the user interface may include one or more user interface elements which correspond to one or more recommended items. A first interact with a swap feature associated with a particular user interface of the one or more user interface elements of the recommended items may be received. The particular user interface may be associated with a particular item. The user interface may be updated to present item information for the particular item, the recommended items and corresponding user interface elements may be updated, and the particular item may be added to a checkout cart user interface element.

20 Claims, 13 Drawing Sheets

SUBSTITUTION PREFERENCES

SIGN IN    SHIPPING    GIFT OPTIONS    PLACED ORDER
                                                      ↙ 914

☑ AVOCADO HASS LARGE ORGANIC, 1 EACH
   $2.49

☑ EVERYDAY VALUE, ORGANIC SPRING MIX, 16 OZ
   $4.99

SUBSTITUTE WITH THIS ITEM  CHANGE⌄      [SWAP] ← 902

☐ AVOCADO HASS MEDIUM CONVENTIONAL, 1 EACH
   $1.39

DON'T SUBSTITUTE  CHANGE⌄

☐ CHOBANI NON-FAT GREEK YOGURT, STRAWBERRY ON THE BOTTOM 5.3OZ
   $0.99

☐ BANANA ORGANIC WHOLE TRADE GUARANTEE, 1 EACH
   EST. $0.35 ($ 0.85/lB)

SUBSTITUTE WITH THIS ITEM   CHANGE⌄

☐ CHOBANI LESS SUGAR GREEK YOGURT, GLI CHERRY 5.3OZ
   $1.39

SUBSTITUTE WITH BEST AVAILABLE  CHANGE⌄
                                         ↖ 910

☐ ORGANIC WHOLE MILK, ULTRA
   $4.29

SUBSTITUTE WITH BEST AVAILABLE   CHANGE⌄

☐ EVERYDAY VALUE, ORGANIC BUTTERNUT SQUASH, 16 OZ. (FROZEN)
   $2.69

SUBSTITUTE WITH BEST AVAILABLE  CHANGE⌄

☐ SALMON FILLET ATLANTIC FARM RAISED  ← 912
   $9.99/lB

SUBSTITUTE WITH BEST AVAILABLE   CHANGE⌄

☐ ORGANIC OVEN ROASTED TURKEY BREAST, 8OZ
   $5.39

SUBSTITUTE WITH BEST AVAILABLE  CHANGE⌄

☐ EVERYDAY VALUE PISTACHIOS ROASTED & SALTED, 24
   $11.99

SUBSTITUTE WITH BEST AVAILABLE   CHANGE⌄

☐ SPARKLING WATER ORANGE, 12 OZ. PACK OF 12, NATURALLY ESSENCED, 0 CALORIES.
   $2.49

SUBSTITUTE WITH BEST AVAILABLE  CHANGE⌄

ITEM SWAP FEATURE

BACKGROUND

Users can browse and order a plethora of items offered by online retailers through the user of computer devices and networks. Users can search for specific items or browse through categories of items offered by retailers that in turn provide information about the offered items such as prices and shipping availability. Users may be presented with other items that are related to the specific items or categories of items. A user who wishes to switch one item that is already in a checkout cart for another item may be frustrated as they interact with multiple user interfaces to achieve such a result. Further, users may forget during their shopping journey which item they intended to switch for another item upon browsing the other items. Thus, there are technical challenges in determining which items to present and implementing functionality to switch items during a shopping journey.

BRIEF DESCRIPTION OF THE DRAWINGS

Various embodiments in accordance with the present disclosure will be described with reference to the drawings, in which:

FIG. 9 depicts an example user interface for presenting an item swap feature in a substitution preferences portion of an application, in accordance with embodiments;

DETAILED DESCRIPTION

Figure 1:
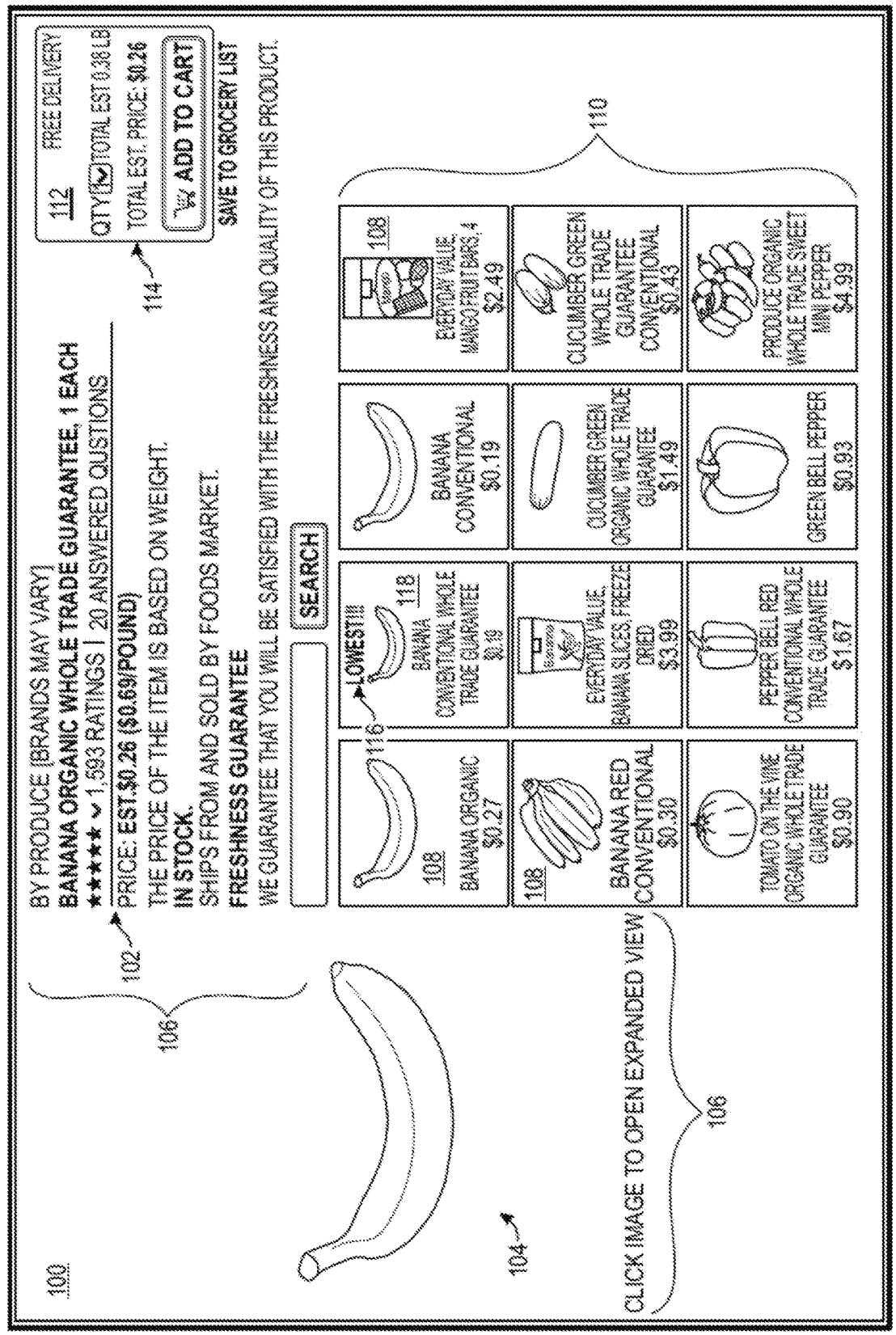
FIG. 1 depicts an example user interface for presenting an item swap feature, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for implementing an item swap feature for exchanging one item currently being interacted with or browsed in a user interface for another item also being presented via said user interface. In embodiments, a user may utilize a user interface provided by a user device or one or more service provider computers to provide a search query for an item (or service) offered by an online merchant. In response to the search query the user interface may be updated to present one or more search results including one or more items that match the search query. As a user interacts with a specific search result item they may be redirected or the user interface may update to present item information for the item (e.g., an item detail page). In addition to being presented with information such as reviews, prices, and shipping details for the item, the user may also be presented, via the user interface, with one or more recommended items. Each of the user interface elements that correspond to the one or more recommended items presented via the user interface may be configured to present one or more features including an item swap feature upon receiving input via the user interface and provided by the user. Upon receiving, via the user interface, input that a user has interacted with the item swap feature for a particular item the user interface may transition to an item detail page for the particular item. The user interface may also update the one or more recommended items to correspond to recommended items for the recently transitioned to particular item and indicate that the particular item has been added to a check-out cart or check-out cart user interface element.

A user may continue through a shopping journey and receive new recommended items as well as automatically modify their checkout cart by interacting with the features of the user interface and user interface elements (e.g., interacting with the item swap feature of multiple items consecutively). In embodiments, the user device or one or more service provider computers may be configured to implement the item swap features described herein as well as generate, transmit, and update the user interface and associated user interface elements described herein. In accordance with at least one embodiment, by interacting with the swap feature for a particular item the user interface may be updated to indicate that the item swapped from is now set as a preferred substitute item should the swapped to item be unavailable during fulfillment or delivery. For example, a user may be browsing an item detail page for a traditional banana where one of the recommended items is for an organic banana. The user may interact with the item swap feature for the organic banana and the user interface would update to: transition to an item detail page for the organic banana; update the one or more recommended items based on the organic banana; add the organic banana automatically to the user's check-out cart; and indicate that the traditional banana is a preferred substitute. Other features may be associated with each user interface element of the one or more recommended items. For example, a substitute feature may enable a user to designate a particular item of the recommended items as preferred substitute for an item currently being viewed or added to their check-out cart. Another feature may enable a user to automatically add one of the recommended items to their check-out cart.

In accordance with at least one embodiment, the item swap feature may be implemented and presented in other user interfaces than an item detail page. For example, substitution preference user interfaces may implement an item swap feature such that items that are recommended as substitutes for other items can instead be automatically swapped as will be discussed in more detail with reference to FIGS. 5-9. The item swap feature may also be implemented and presented in a check-out cart user interface where users may replace items in their cart automatically with recommended items or items that were historically purchased by the user. Users can grow frustrated, end shopping journeys prematurely, or forget to purchase certain items as online merchants can offer a plethora of items and implement confusing navigation of their offerings. However, the methods and systems described herein utilize an item swap feature to more efficiently navigate a user during their shopping journey, automatically add items to their check-out cart, and present relevant recommendations. In embodiments, the recommendations that are presented are updated based on the data provided by users as they interact with the item swap features, designate substitutions, and add items to their cart.

FIG. 1 depicts an example user interface 100 for presenting an item swap feature, in accordance with embodiments. The user interface 100 includes item information 102 for an item 104 presented in a first area 106 of the user interface 100. The user interface 100 also depicts a plurality of user interface elements 108 where each user interface element of the plurality of user interface elements 108 is associated with a recommended item. The plurality of user interface elements 108 associated with the recommended items may be presented in a second area 110 of the user interface 100. In embodiments, the item information 102 may include item details such as brand names, item names, prices, reviews, images for the item, or other suitable information about an item such as stock availability, sales, etc. In accordance with at least one embodiment, the recommended items included in the plurality of user interface elements 108 may be generated based at least in part on the currently viewed item (104). The computer system or service provider computers implementing user interface 100 may utilize a number of policies or rules when generating the recommended items.

In accordance with at least one embodiment, the policies or rules may include an availability policy ensuring that an item is not included as a recommended item unless it is in stock at the moment, based on information from one or more vendors or third party computers, regional or legislation rules or policies including rules for offerings of certain categories of items to certain demographics or based on attributes of the items themselves, payment authorization rules which limit a monetary amount that a recommended item must stay under based on a pre-approved monetary amount for another item, vendor specific rules which limit recommended items or item categories, or other suitable rules and policies for item offerings and recommended items. Other rules or policies may be utilized to filter and rank the recommended items that are presented via the plurality of user interface elements 108 such as rules or policies specified by an entity associated with an online merchant or an entity associated with the service provider computers implementing the item swap feature. For example, rules and policies my limit the number of recommended items that are presented to a user via user interface 100 or limit the item categories from which potential recommended items may be derived from based on an item category of a currently viewed or browsed item.

In accordance with at least one embodiment the service provider computers implementing the item swap feature may utilize an algorithm to generate the recommended items associated with the plurality of user interface elements 108. The service provider computers may use feedback information from users interacting with the user interface 100, adding items, such as item 104 to a check-out cart 112, interacting with an item swap feature, a substitute feature, or an add-to-cart feature (described in FIGS. 2-4). The user interface 100 may include a checkout cart user interface element 114 which notifies a user of which items or how many items are added to the checkout cart for their current shopping journey. The plurality of user interface elements 108 also depict an indicator 116 for notifying the user of certain information associated with a particular recommended item. For example, the indicator 116 for recommended item 118 may notify a user that the recommended item 118 is the lowest price item of all the recommended items included in the plurality of user interface elements 108. The service provider computers may generate a plurality of indicators that indicate various information to a user about the recommended items. For example, the service provider computers may utilize historical transaction information from a user profile associated with a user to identify if any of the recommended items were previously purchased. The plurality of indicators can also indicate certain dietary restrictions obtained from the user's profile or preferences or other suitable information.

Figure 2:
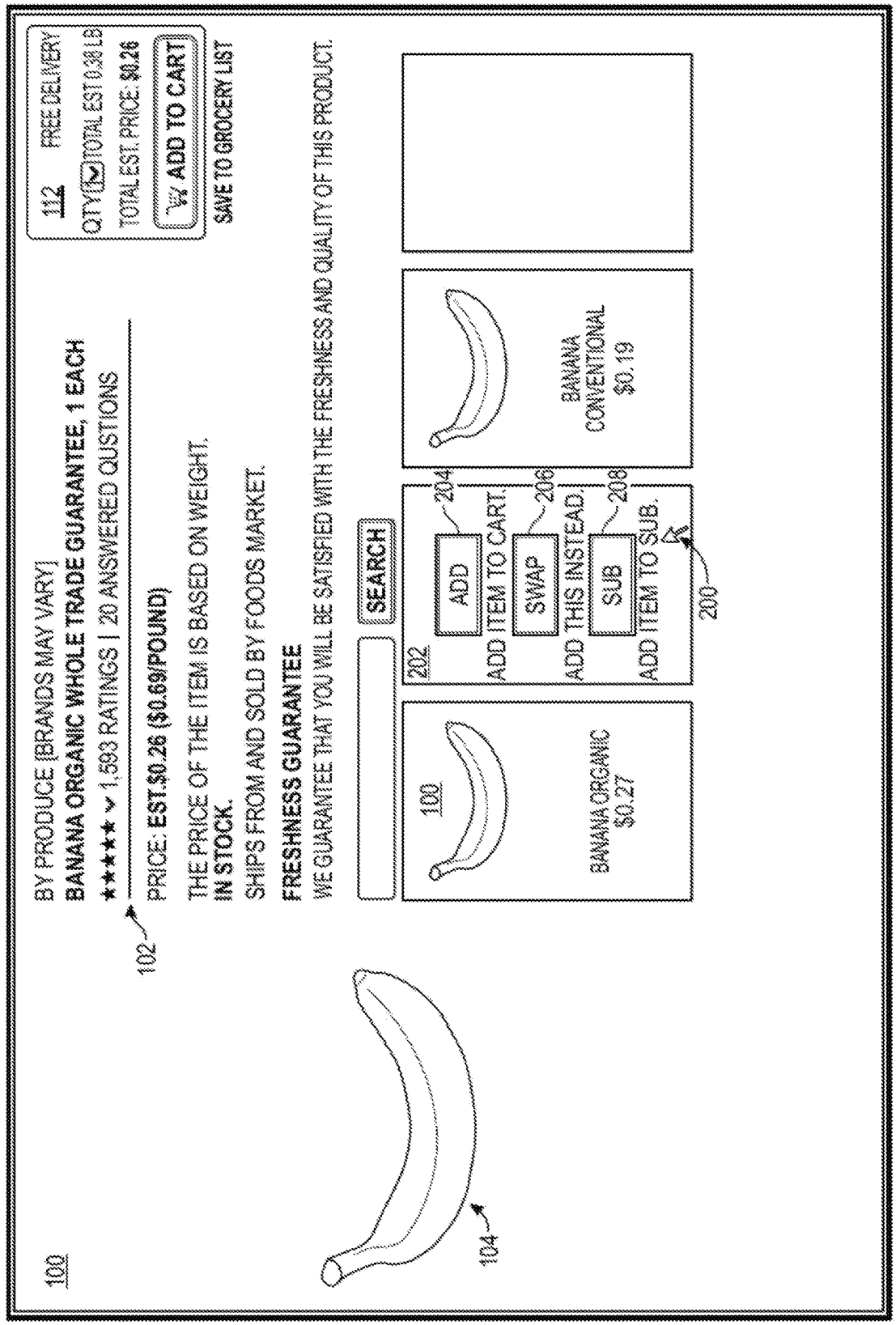
FIG. 2 depicts an example user interface for presenting an item swap feature, in accordance with embodiments.

FIG. 2 depicts an example user interface 100 for presenting an item swap feature, in accordance with embodiments. FIG. 2 may illustrate the updates to user interface 100 as a user interacts with the user interface 100 during a shopping journey. In user interface 100, a user may utilize an input/output device or other gesture input to interact 200 with a particular user interface element 202 of the plurality of user interface elements 108 of FIG. 1. Upon providing the interaction 200, the particular user interface element 202 may update to present one or more features including at least an add-to-cart feature ("add") 204, an item swap feature ("swap") 206, and an item substitute feature ("sub") 208. In embodiments, the user may interact 200 with the add-to-cart feature 204 to add the corresponding item to their checkout cart 112. A user may also interact 200 with item substitute feature 208 to indicate that the corresponding item should be used as a substitute item should the item 104 be unavailable during fulfillment or delivery. A user may interact with item swap feature 206 to swap the corresponding item into their checkout cart 112 while also transitioning the user interface 100 to an item detail page for the corresponding item as illustrated in FIG. 3.

Figure 3:
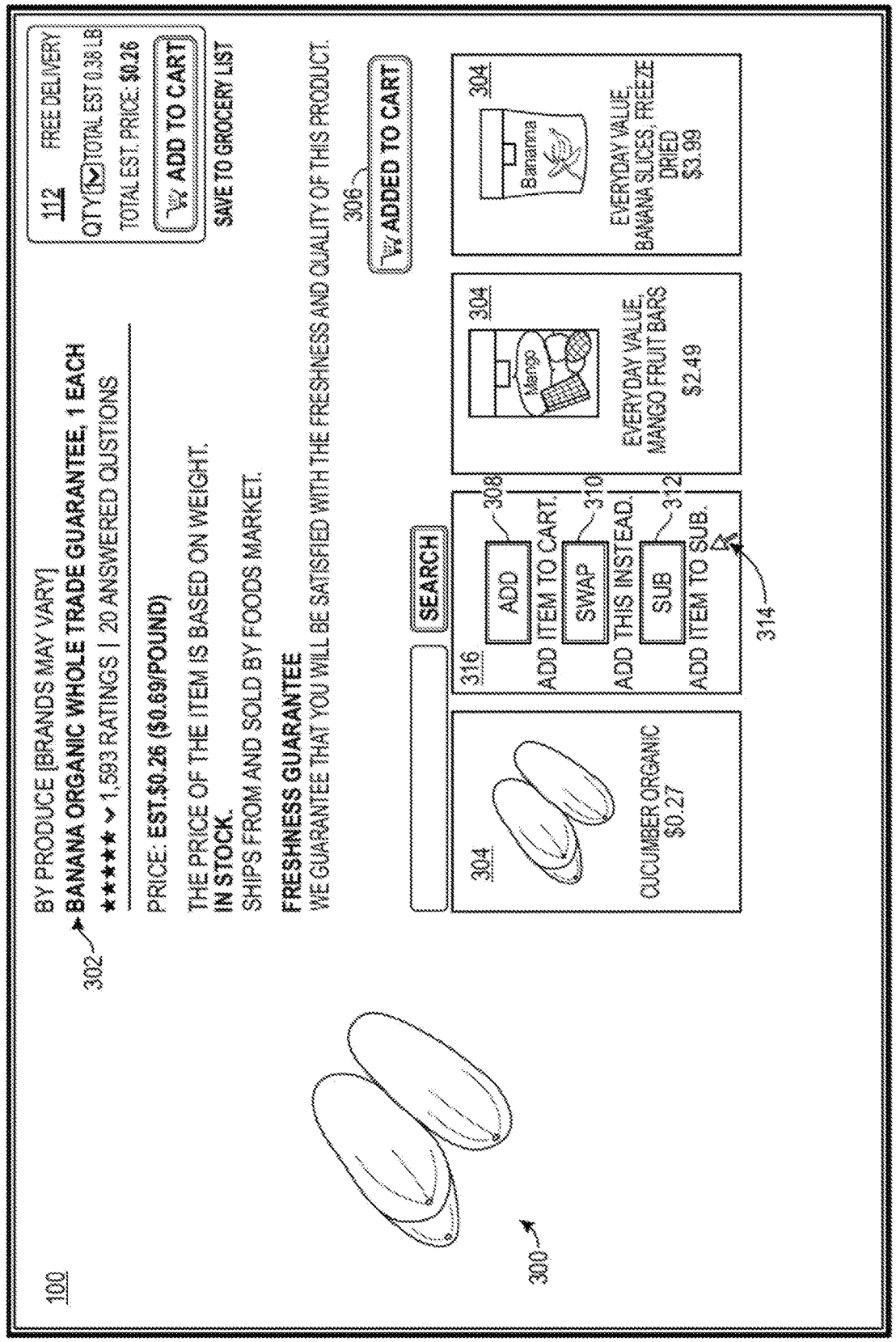
FIG. 3 depicts an example user interface for presenting an item swap feature in which one item has been swapped for another item, in accordance with embodiments.

FIG. 3 depicts an example user interface for presenting an item swap feature in which one item has been swapped for another item, in accordance with embodiments. FIG. 3 illustrates the updates to user interface 100 as a user interacts with the user interface 100 during a shopping journey. Specifically, FIG. 3 illustrates the transition of user interface 100 from item 104 to a new item, item 300 in response to the interaction with the item swap feature 206 of FIG. 2. User interface 100 may be updated to present new item information 302 for the item 300 as the user interface transitions from item information 102 for item 104. The user interface 300 may be updated to present a different set of recommended items 304 which are generated based at least in part on the item 300 and may include different items from the recommended items associated with the plurality of user interface elements 108 of FIG. 1.

User interface 300 may also be updated to include an indicator 306 that the item 300 has been added to their checkout cart 112 in response to the interaction with the item swap feature 206 of FIG. 2. In embodiments, the indicator 306 and/or the checkout cart 112 may be presented in a third area of the user interface. It should be noted that although FIGS. 1-3 and other figures described herein may refer to certain areas or configurations of user interfaces or user interface elements, any suitable configuration and use of user interface elements may be implemented in accordance with the item swap features described herein. The user interface 300 may be configured to present features including add-to-cart feature 308, 310, and 312 which are similar to the features 204-208 of FIG. 2 in response to an interaction 314 with a different item 316. In embodiments, a user may interact 314 with the item swap feature 310 of item 316 to swap item 316 into the checkout cart 112 and swap item 300 out of the checkout cart 112. A user may continue to interact with the user interface 100 and plurality of user interface elements including the item swap feature 310 to browse items offered by an online merchant during a shopping journey.

Figure 4:
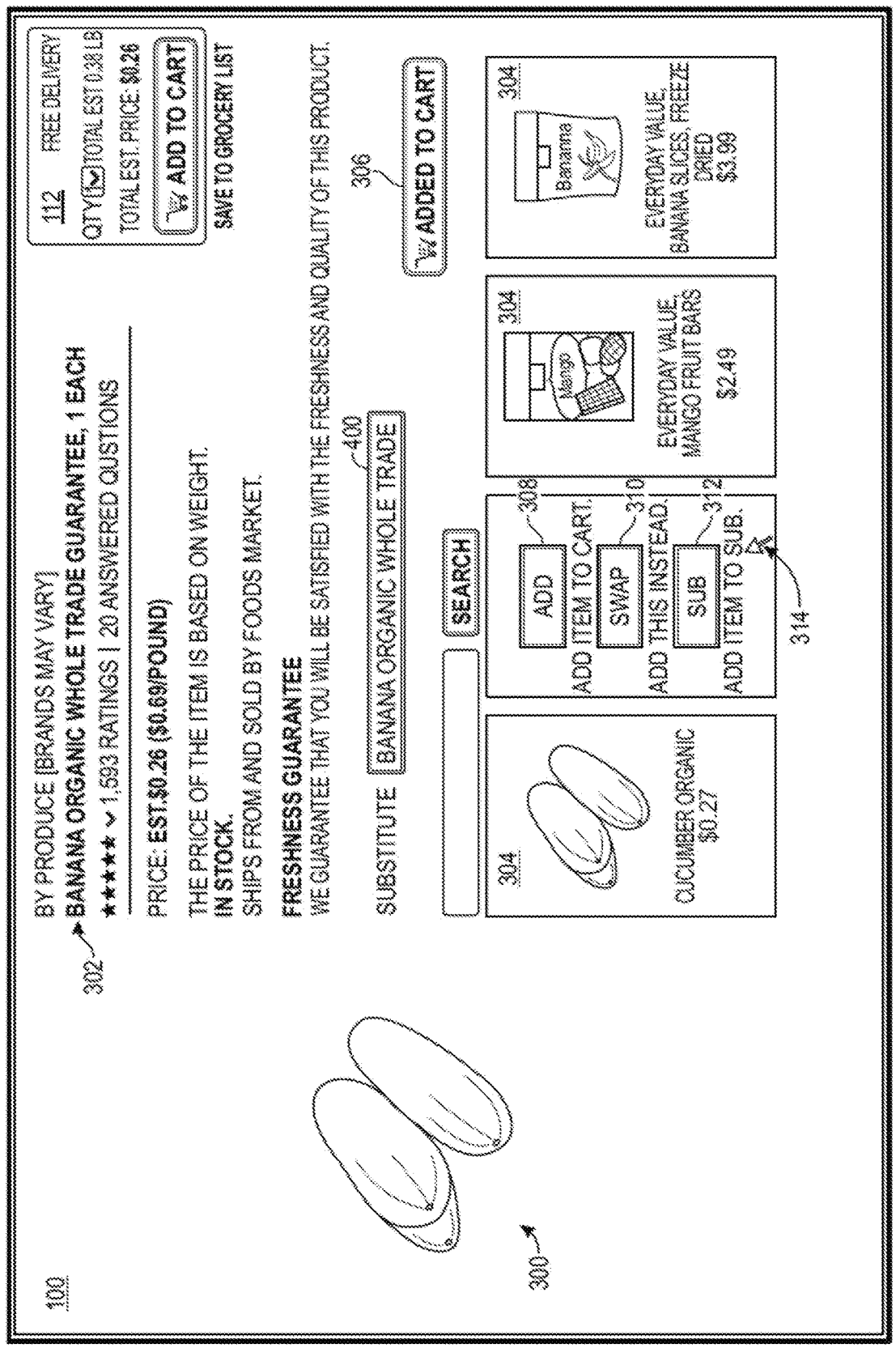
FIG. 4 depicts an example user interface for presenting an item swap feature in which the swapped out item is indicated as a substitute item, in accordance with embodiments.

FIG. 4 depicts an example user interface 100 for presenting an item swap feature in which the swapped out item is indicated as a substitute item, in accordance with embodiments. FIG. 4 illustrates an embodiment in which the user interface 100 is updated during a transition from FIGS. 2 to 3 to indicate that the previous item (item 104 of FIG. 2) is designated as a substitute item 400. The designation of substitute item 400 can aid the user in receiving an item in situations when the item 300 is unavailable or unable to be fulfilled during procurement of the items in the checkout cart 112 at the end of a shopping journey or during packaging and delivery. In accordance with at least one embodiment, the service provider computers may maintain and update a database which identifies associations or mappings of items to substitute items for a plurality of user's orders and checkout carts. In embodiments, the service provider computers may utilize the mappings and associations of items to substitute items to update the recommended items generated for a user interface in response to an item query. The designation of substitute item 400 may be updated as the user interacts 314 with the item swap feature 310 of another item in user interface 100. The indicator 306 also updates as the user interacts 314 with the item swap feature 310 of other items to indicate the automatic addition of the item to the checkout cart 112 as well as to enable a user to keep track of the substitutions and swaps taking place during a shopping journey.

Figure 5:
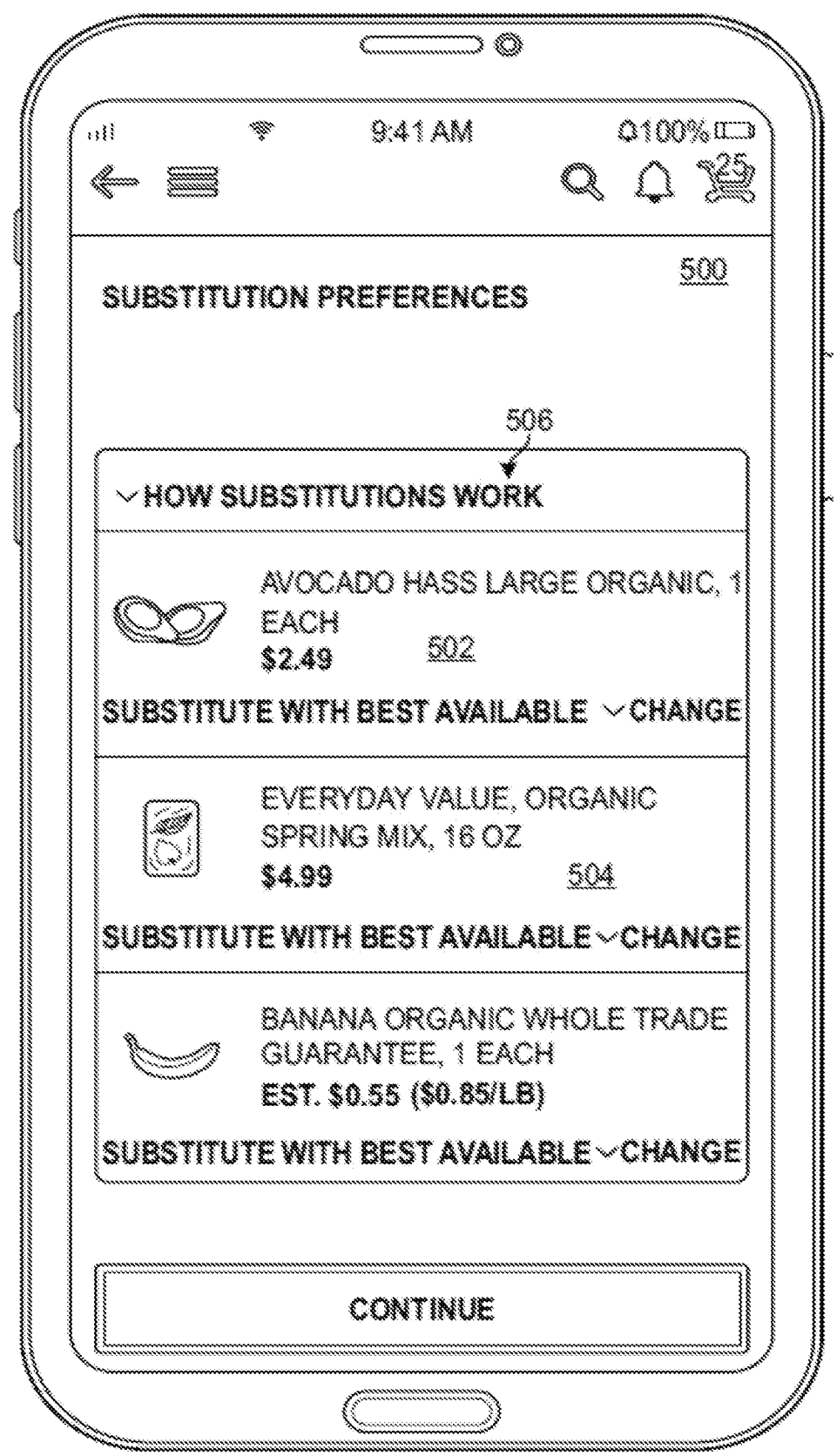
FIG. 5 depicts an example user interface for presenting an item swap feature in a substitution preferences portion of an application, in accordance with embodiments.

FIG. 5 depicts an example user interface 500 for presenting an item swap feature in a substitution preferences portion of an application, in accordance with embodiments. The user interface 500 may correspond to a substitution preferences user interface configured to enable a user to specify certain substitutions to utilize when fulfilling items from their checkout cart if said items are unavailable during fulfillment. The user interface 500 may be implemented by the service provider computers or user device. The user interface 500 illustrated in FIG. 5 may include one or more items 502 and 504 added to their checkout cart and an informative notification 506 of how item substitutions work. The user interface 500 may depict information about the items 502 and 504 including descriptive information, price, shipping information, and reviews.

Figure 6:
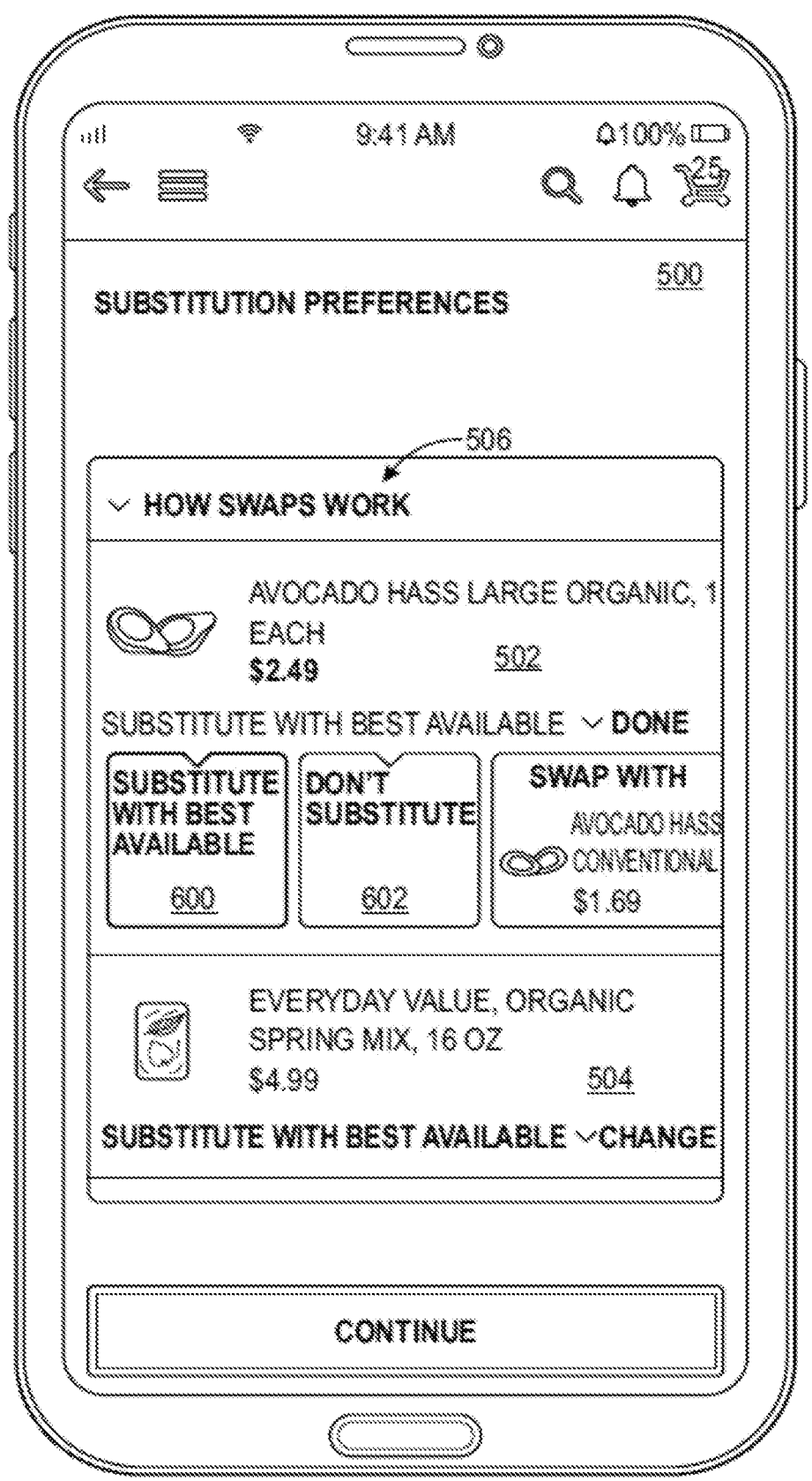
FIG. 6 depicts an example user interface for presenting an item swap feature in a substitution preferences portion of an application, in accordance with embodiments.

FIG. 6 depicts an example user interface 500 for presenting an item swap feature in a substitution preferences portion of an application, in accordance with embodiments. The user interface 500 of FIG. 6 may be an update to the user interface 500 of FIG. 5 as the user interacts with the user interface 500 to view more features such as an item swap feature. The user interface 500 depicts several options or features that a user may interact with via user interface 500 for substituting an item or learning about swapping an item. For example, user interface 500 depicts a feature for substituting with a best available item 600, and a don't substitute the item feature 602. The service provider computers may generate a substitute item for the item 502 in response to a user selecting the substitute best available item 600 feature in user interface 500. The service provider computers may determine a best substitute item based on information from a user profile of the user selecting or ordering the item 502 such as past transactions, preferences, or aggregate information from other users of the online marketplace. For example, the service provider computers may designate an item that is selected as a substitute for item 502 by a majority of other users of the online marketplace. The service provider computers may provide instructions to not fulfill the order for the item 502 should it be unavailable in response to a user selecting the don't substitute the item feature 602.

Figure 7:
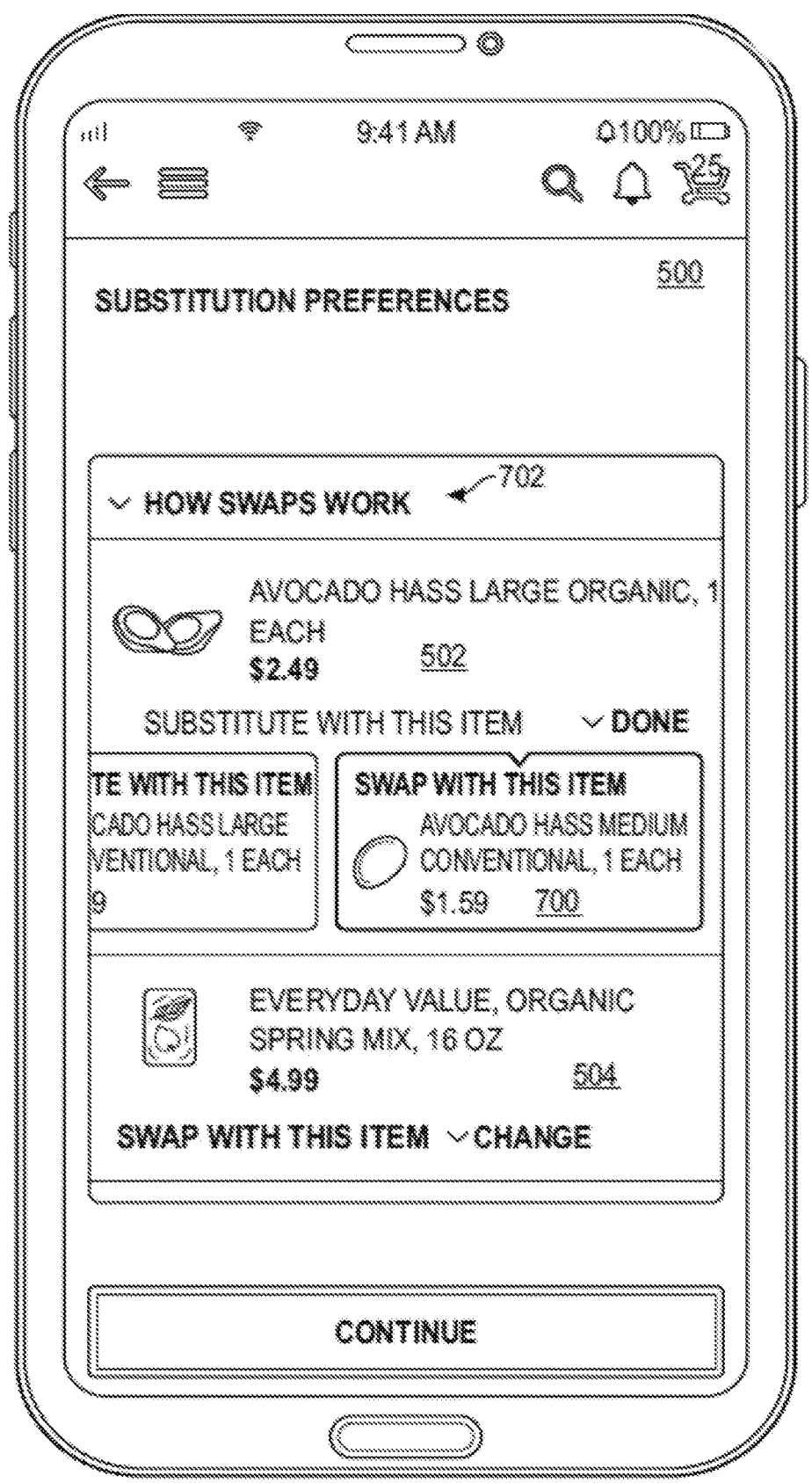
FIG. 7 depicts an example user interface for presenting an item swap feature in a substitution preferences portion of an application, in accordance with embodiments.

FIG. 7 depicts an example user interface 500 for presenting an item swap feature in a substitution preferences portion of an application, in accordance with embodiments. The user interface 500 of FIG. 7 may be an update to the user interface 500 of FIG. 6 as the user interacts with user interface 500 to view more features such as an item swap feature 700. The user interface 500 may update to provide a notification 702 informing a user how item swap feature 700 works. In embodiments, the service provider computers implementing the item swap feature described herein may generate one or more recommended items for populating the item swap feature 700 which are appropriate for the item 502. The service provider computers may utilize an algorithm as well as rules and policies described herein for generating the recommended items to present to a user via the item swap feature 700 in user interface 500.

Figure 8:
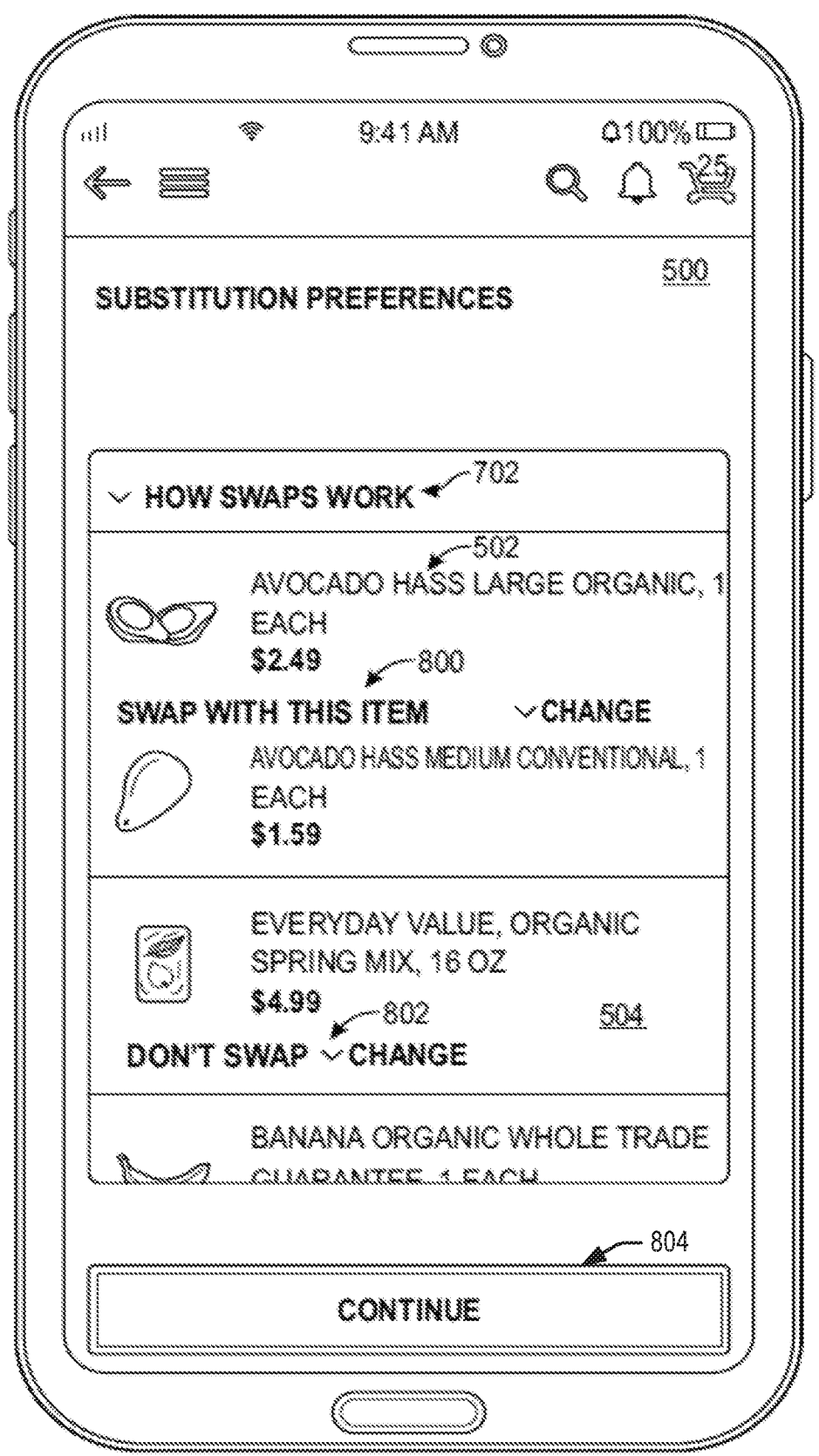
FIG. 8 depicts an example user interface for presenting an item swap feature in a substitution preferences portion of an application, in accordance with embodiments.

FIG. 8 depicts an example user interface 500 for presenting an item swap feature in a substitution preferences portion of an application, in accordance with embodiments. The user interface 500 of FIG. 8 may be an update to the user interface 500 of FIG. 7 as the user interacts with the user interface 500 and more particularly the item swap feature 700 for item 502. The user interface 500 of FIG. 8 depicts an update to the user interface 500 indicating that the user has selected the item swap feature 700 for item 502. The selection of the item swap feature 700 is depicted at 800 as well as an indication that an item swap has not been performed 802 for item 504. By utilizing the item swap feature 700 for item 502 a user may modify their checkout cart from an substitution preferences user interface as opposed to other user interfaces described herein. Thus, a user is more efficiently able to modify the items in their checkout cart without navigating through a plurality of user interfaces or options provided by an online marketplace. In embodiments, a user may interact with a feature of user interface 500, such as feature 804 ("Continue") to confirm an item swap feature 800 for item 502. In accordance with at least one embodiment, the user does not need to provide additional input or confirmation via user interface 500 to confirm the item swap between items, instead the item swap occurs automatically upon the user interacting with the item swap feature, such as item swap feature 800 for item 502.

FIG. 9 depicts an example user interface 900 for presenting an item swap feature in a substitution preferences portion of an application, in accordance with embodiments. The user interface 900 depicts the item swap feature 902 for swapping item 904 for item 906. The user interface 900 also depicts an item substitute feature 908. The user interface 900 may be a user interface associated with item substitution preferences or a substitution portion of an application associated with an online marketplace. The user interface 900 also depicts other items 910 and 912 along with item 906 that may have previously been added to a user's checkout cart during a shopping journey. As described herein, a user may interact with user interface 900 and the item swap feature 902 to automatically swap one item (904) for another item (906) in their checkout cart without having to navigate through a plurality of user interfaces. The item substitute feature 908 may be generated by the service provider computers as a recommended item or the item substitute feature 908 may include item 904 in response to input provided by a user or a preference provided by a user. It should be noted that although FIGS. 1-4 are described as presenting and implementing an item swap feature in an item detail page or user interface that is configured to present information about an item, FIGS. 5-9 may be presented and implement the item swap feature post-order (e.g., after an order has been placed and paid for but prior to fulfillment and delivery). In embodiments, the user interface 900 may be referred to as an item order page or a post-checkout user interface. The item swap features described herein and represented in FIG. 9 may be configured to enable users to substitute or swap items that are already ordered and paid for with items that are presented via user interface 900. User interface 900 may include an indication 914 that the substitutions and item swaps that are occurring post ordering or for an order that is already placed. A user may interact with a user interface such as user interface 900 to substitute or swap items up until fulfillment by an associate at a store. In embodiments, a user may be receive a notification via a communication channel, such as email, that an item that they have ordered is low in stock, or has a high probability of being out of stock by the time the order is fulfilled. A user may be directed, via a link in the notification, to the user interface 900 where they can substitute items or swap (902) items that they have already ordered with other items to avoid a scenario where an item that they ordered is unfulfilled (e.g., the item that was indicated as low in stock in the notification is out of stock during fulfillment). In embodiments, users may opt-out of receiving such notifications. After an order has been fulfilled by an associate or entity of a store, warehouse, or fulfillment center, instructions may be provided by the computer system or service provider computers to one or more entities for delivering the items to a location that corresponds to the user.

Figure 10:
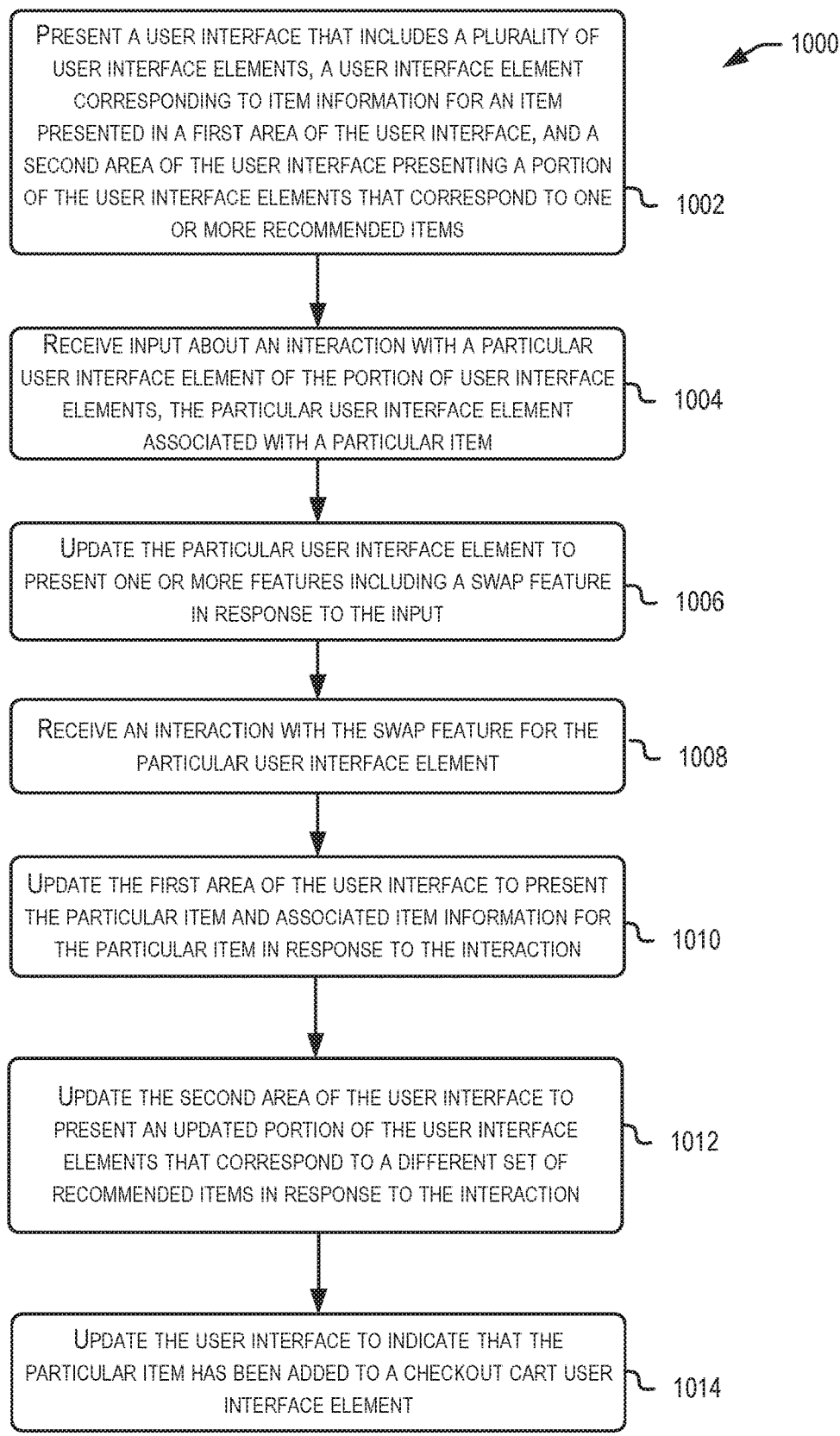
FIG. 10 depicts a flow diagram for an item swap feature, in accordance with embodiments.
Figure 11:
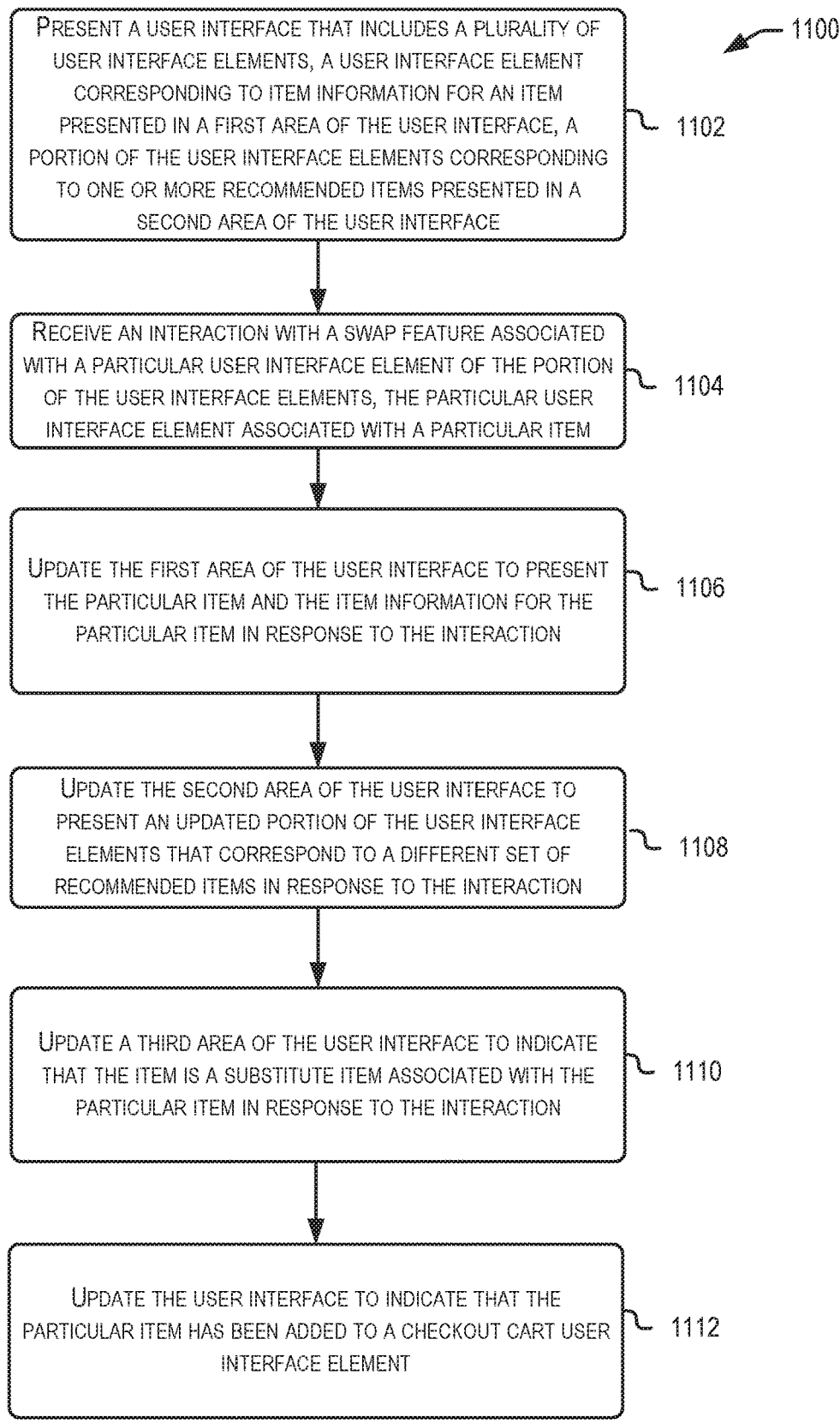
FIG. 11 depicts a flow diagram for an item swap feature, in accordance with embodiments.

FIGS. 10 and 11 illustrate example flow charts for item swap features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium for example, in the form of a computer program including a plurality of instructions executable by one or more processors. The computer-readable storage medium may be non-transitory.

Figure 12:
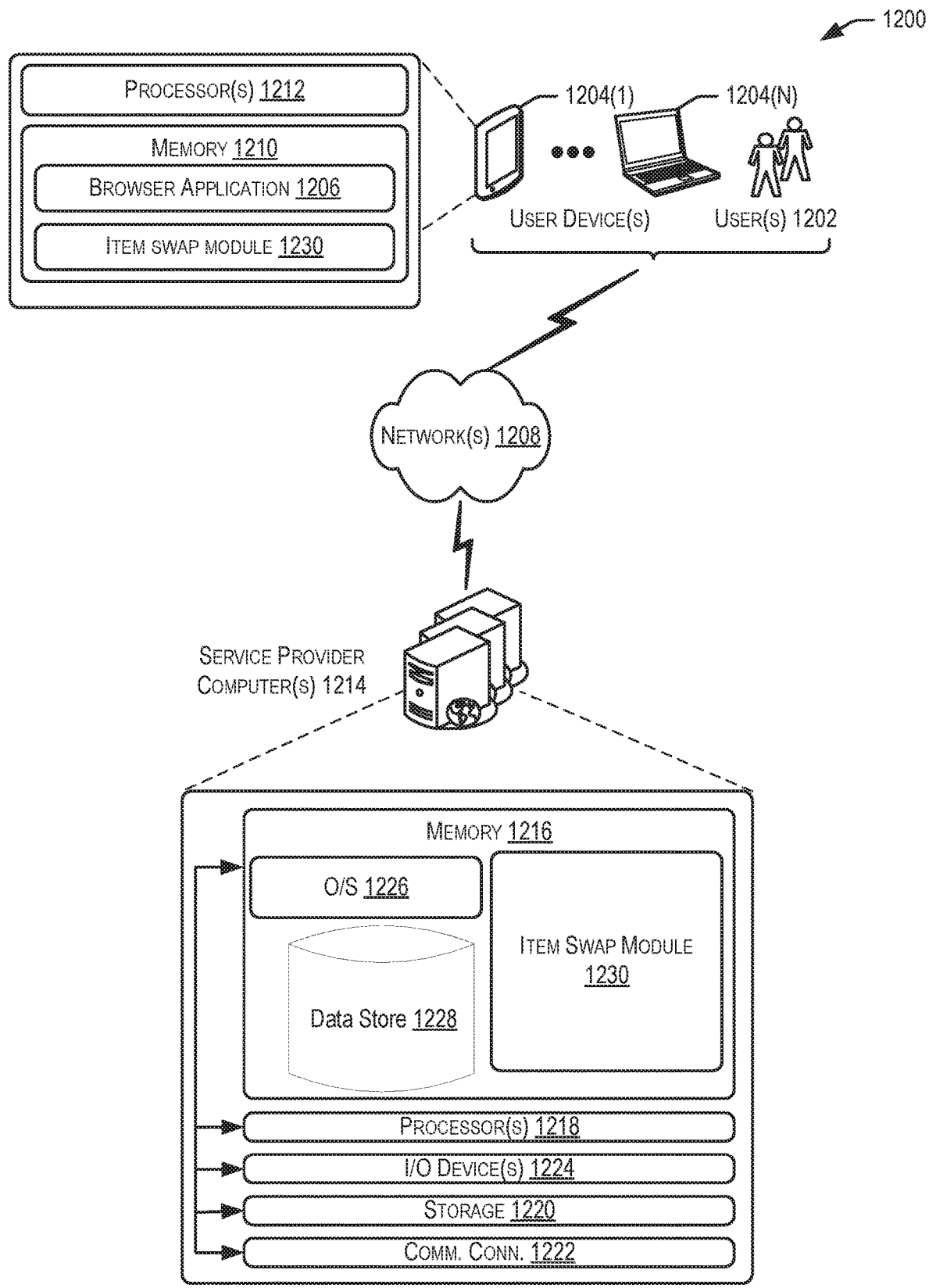
FIG. 12 depicts an illustrative example of a system or architecture for implementing an item swap feature, in accordance with embodiments.

In some examples, service provider computers (service provider computers 1214) utilizing at least the item swap module 1230 of FIG. 12 may perform the processes 1000 and 1100 of FIGS. 10 and 11. In FIG. 10, the process 1000 may include presenting a user interface that includes a plurality of user interface elements where a user interface element corresponding to item information for an item may be presented in a first area of the user interface, and a second area of the user interface may present a portion of the user interface elements that correspond to one or more recommended items at 1002. In embodiments, the plurality of user interface elements may be presented via the user interface in response to an item query or search query for an item submitted via the user interface. In embodiments, the plurality of user interface elements may be presented via the user interface in response to an interaction with a query result of the item query or search. In accordance with at least on embodiment, the recommended items may be grouped or combined into a combination of item recommendations. For example, one of the user interface elements may be a recommendation for a combination of items such as peanut butter and jelly which may both be automatically added to a user's checkout cart upon the user interacting with the corresponding add-to-cart feature or the item swap feature.

The process 1000, may include receiving input about an interaction with a particular user interface element of the portion of user interface elements at 1004. The particular user interface element may be associated with a particular item of the recommended items. The process 1000 may include updating the particular user interface element to present one or more features including a swap feature in response to the input at 1006. In embodiments, other features such as an item substitute feature and an add-to-cart feature may be presented in the user interface in response to the input. The process 1000 may include receiving an interaction with the swap feature for the particular user interface element at 1008. The process 1000 may include updating the first area of the user interface to present the particular item and associated item information for the particular item in response to the interaction at 1010. In embodiments, the user interface may transition or update to present item information for the swapped to item in response to the interaction. The process 1000 may include updating the second area of the user interface to present an updated portion of the user interface elements that correspond to a different set of recommended items in response to the interaction at 1012. The process 1000 may include updating the user interface to indicate that the particular item has been added to a checkout cart user interface element of the user interface.

The process 1100 may include presenting a user interface that includes a plurality of user interface elements at 1102. In embodiments, a user interface element corresponding to item information for an item may be presented in a first area of the user interface, and a portion of the user interface elements corresponding to one or more recommended items may be presented in a second area of the user interface. The process 1100 may include receiving an interaction with a swap feature associated with a particular user interface element of the portion of the user interface elements at 1104. The particular user interface element may be associated with a particular item of the one or more recommended items. The process 1100 may include updating the first area of the user interface to present the particular item and the item information for the particular item in response to the interaction at 1106.

The process 1100 may include updating the second area of the user interface to present an updated portion of the user interface elements that correspond to a different set of recommended items in response to the interaction at 1108. The different set of recommended items may be different that the one or more recommended items previously presented in the second area of the user interface. The process 1100 may include updating a third area of the user interface to indicate that the item is a substitute item associated with the particular item in response to the interaction at 1100. The designation of the item previously presented in the first area of the user interface as a substitute item can be used to fulfill an item order upon fulfillment of the items in the checkout cart at the end of a user's shopping journey. The process 1100 may include updating the user interface to indicate that the particular item has been added to a checkout cart user interface element at 1112.

FIG. 12 depicts an illustrative example of a system or architecture 1200 for implementing an item swap feature, in accordance with embodiments. In architecture 1200, one or more users 1202 may utilize user computing devices 1204(1)-(N) (collectively, user devices 1204) to access a browser application 1206 (e.g., a web browser) or a user interface (UI) accessible through the browser application 1206, via one or more networks 1208. The "browser application" 1206 can be any browser control or native application that can access and display a network page or other information. In some aspects, the browser application 1206 may be hosted, managed, and/or provided by a computing resources service or service provider, such as by utilizing one or more service provider computers 1214. The one or more service provider computers 1214 may, in some examples, provide computing resources such as, but not limited to, client entities, low latency data storage, durable data storage, data access, management, virtualization, hosted-computing-system-based software solutions, electronic content performance management, online retailer item or service offerings, etc. The one or more service provider computers 1214 may also be operable to provide web or network hosting, computer application development, and/or implementation platforms, combinations of the foregoing, or the like to the one or more users 1202.

In one illustrative configuration, the user devices 1204 may include at least one memory 1210 and one or more processing units or processor(s) 1212. The processor(s) 1212 may be implemented as appropriate in hardware, computer-executable instructions, firmware, or combinations thereof. Computer-executable instruction or firmware implementations of the processor(s) 1212 may include computer-executable or machine-executable instructions written in any suitable programming language to perform the various functions described. The user devices 1204 may also include geo-location devices (e.g., GPS device or the like) for providing and/or recording geographic location information associated with the user devices 1204.

The memory 1210 may store program instructions that are loadable and executable on the processor(s) 1212, as well as data generated during the execution of these programs. Depending on the configuration and type of user device 1204, the memory 1210 may be volatile (such as random access memory (RAM)) and/or non-volatile (such as read-only memory (ROM), flash memory, etc.). The user device 1204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1210 may include multiple different types of memory, such as static random access memory (SRAM), dynamic random access memory (DRAM), or ROM.

Turning to the components of the memory 1210 in more detail, the memory 1210 may include an operating system and one or more application programs or services for implementing the features disclosed herein via the browser application 1206 or dedicated applications (e.g., smart phone applications, tablet applications, etc.). The browser application 1206 may be configured to receive, store, and/or display a website, a link to an online retailer, or other interface for interacting with the one or more service provider computers 1214 such as displaying items or services offered by online merchants, vendors, etc., as well as items or service search results responsive to a query provided by a user 1202. Additionally, the memory 1216 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 1202 provided response to a security question or a geographic location obtained by the user device 1204. In embodiments, the user device 1204 may be configured to perform the features of the item swap feature discussed with reference to FIGS. 1-11.

In some examples, the networks 1208 may include any one or a combination of many different types of networks, such as cable networks, the Internet, wireless networks, cellular networks and other private and/or public networks. While the illustrated example represents the users 1202 accessing the browser application 1206 over the networks 1208, the described techniques may equally apply in instances where the users 1202 interact with the one or more service provider computers (service provider computers) 1214 via the one or more user devices 1204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 1206 may allow the users 1202 to interact with the one or more service provider computers 1214, such as to access content like webpages or network pages. The one or more service provider computers 1214, perhaps arranged in a cluster of servers or as a server farm, may host the browser application 1206 and/or cloud-based software services. Other server architectures may also be used to host the browser application 1206 and/or cloud-based software services. The browser application 1206 may be capable of handling requests from many users 1202 and serving, in response, various user interfaces that can be rendered at the user devices 1204 such as, but not limited to, a webpage, a website, network site, a network page, items or services offered by an online retailer, responses to queries for items or services provided by users 1202, or other user interface updates described herein. The browser application 1206 can interact with any type of website or network site that supports user interaction, including social networking sites, electronic retailers, informational sites, blog sites, search engine sites, news and entertainment sites, and so forth. The described techniques can similarly be implemented outside of the browser application 1206, such as with other applications running on the user device 1204.

The one or more service provider computers 1214 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 1214 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 1214 may be in communication with the user device 1204 via the networks 1208, or via other network connections. The one or more service provider computers 1214 may include one or more servers, perhaps arranged in a cluster or as individual servers not associated with one another. The one or more service provider computers 1214 may be in communication with one or more third party computers, one or more sensors, or one or more computer systems (not pictured) via networks 1208. The one or more service provider computers 1214 that host the browser application 1206 may obtain and provide data to third party computers or one or more computer systems via networks 1208 in accordance with embodiments described herein.

In one illustrative configuration, the one or more service provider computers 1214 may include at least one memory 1216 and one or more processing units or processors(s) 1218. The processor(s) 1218 may be implemented as appropriate in hardware, computer-executable instructions, firmware, or combinations thereof. Computer-executable instruction or firmware implementations of the processor(s) 1218 may include computer-executable or machine-executable instructions written in any suitable programming language to perform the various functions described. The memory 1216 may store program instructions that are loadable and executable on the processor(s) 1218, as well as data generated during the execution of these programs. Depending on the configuration and type of the one or more service provider computers 1214, the memory 1216 may be volatile (such as RAM) and/or non-volatile (such as ROM, flash memory, etc.). The one or more service provider computers 1214 or servers may also include additional storage 1220, which may include removable storage and/or non-removable storage. The additional storage 1220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1216 may include multiple different types of memory, such as SRAM, DRAM, or ROM.

The memory 1216, the additional storage 1220, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1216 and the additional storage 1220 are all examples of computer storage media. Additional types of computer storage media that may be present in the one or more service provider computers 1214 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 1214. Combinations of any of the above should also be included within the scope of computer-readable media.

The one or more service provider computers 1214 may also contain communication connection(s) 1222 that allow the one or more service provider computers 1214 to communicate with a stored database, another computing device or server, user terminals and/or other devices on the networks 1208. The one or more service provider computers 1214 may also include I/O device(s) 1224, such as a keyboard, a mouse, a pen, a voice input device, a touch input device, a display, speakers, a printer, etc.

Turning to the contents of the memory 1216 in more detail, the memory 1216 may include an operating system 1226, one or more data stores 1228 and/or one or more application programs, services, or other software modules, which are generally executed by a processor (e.g., the processors 1212 and/or 1218) for implementing the features disclosed herein.

An example module is shown in FIG. 12, but functions and embodiments described herein can utilize a subset of the features provided by the module and/or additional functions can be provided. Additionally, while the example module will now be briefly discussed with regard to FIG. 12, further specific details regarding the example module is provided herein in the descriptions of the Figures.

As an example module of memory 1216, an item swap module 1230 can be provided for generating and transmitting search query results for an item or service offered by an online retailer or online merchant, maintaining and transmitting item information, maintaining, updating, and transmitting or presenting a plurality of user interface elements that are associated with items or services and/or features described herein that correspond to the item swap feature. In embodiments, the item swap module 1230 may be configured to generate, transmit, and update a user interface configured to be displayed on the user device 1204. The user interface may display information about items or services as well as indicate swaps for other items or substitutions for other items that a user 1202 has indicated by interacting with the user interface via user device 1204. The item swap module 1230 may be configured to generate one or more recommended items that correspond to an item being viewed or browsed by a user 1202 using user device 1204 via the user interface. The one or more recommended items may be generated by the item swap module 1230 that implements an algorithm to generate the recommended items. The algorithm or item swap module 1230 may utilize policies and rules to filter the one or more recommended items to a portion or subset that is then presented via the user interface of the user device 1204. The item swap module 1230 may be configured for updating the user interface presented via user device 1204 to present new item information, features such as an item swap, an item substitute, or an add-to-cart feature, and generate and present new recommended items based on the user interacting with the user interface or providing input via the user interface as described herein. In embodiments, the item swap module 1230 may maintain and updating a mapping of items to recommended items as well as items to potential substitute items if an item is unavailable during fulfillment, packaging, delivery, etc. In embodiments, the item swap module 1230 of user device 1204 may perform some or all of the features of the item swap module 1230 of the service provider computers 1214. In accordance with at least one embodiment, the item swap module 1230 may communicate with one or more computer systems (not pictured) to perform services associated with the features described herein including authentication of the user 1202 or user device 1204, or payment settlement at the conclusion of a shopping journey.

Figure 13:
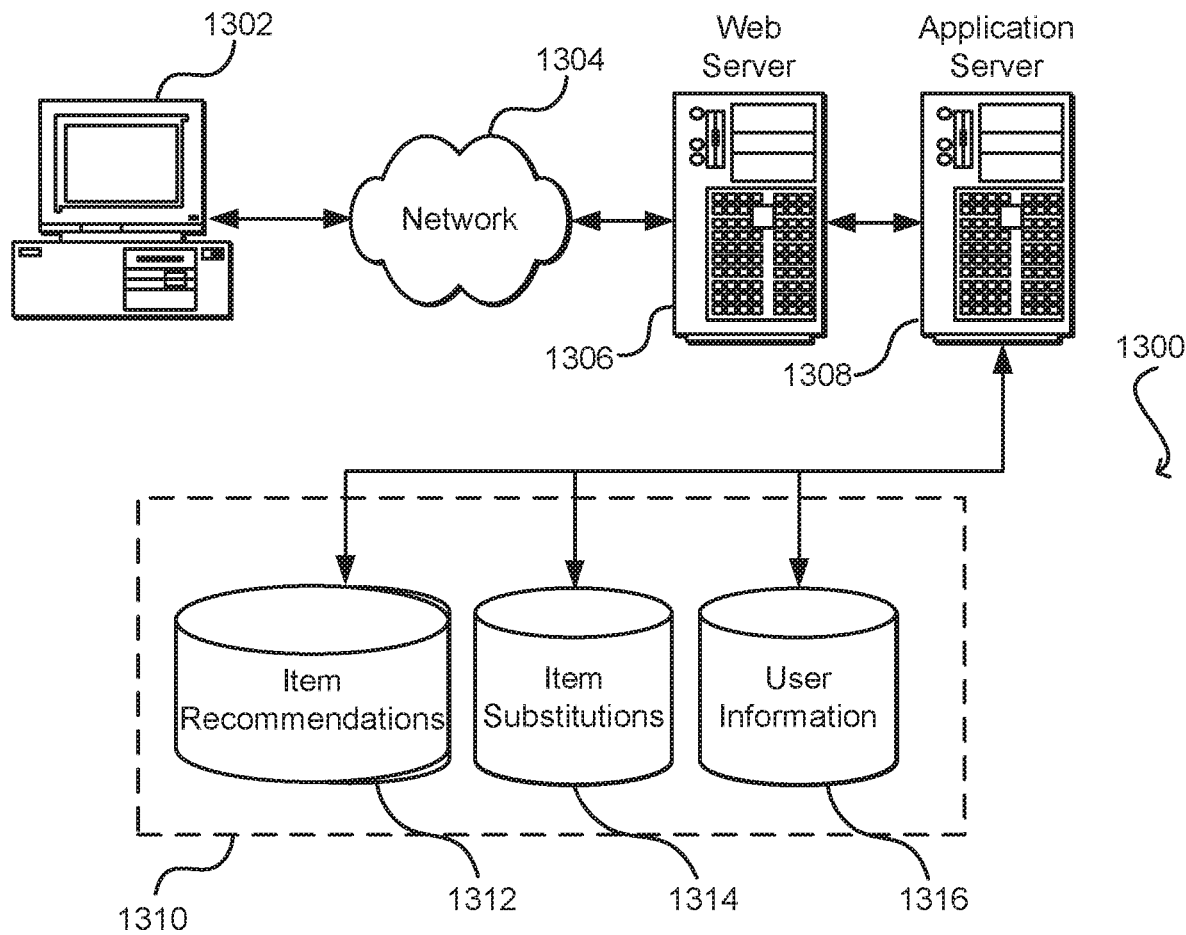
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for item recommendations 1312 and user information 1316, which can be used to serve content for the production side including generating recommendations for items that correspond to an item selected based on a query provided by a user interacting with a user interface provided by the web server 1306 to the client device 1302 via networks 1304. The data store also is shown to include a mechanism for storing item substitutions 1314, which can be used for reporting, analysis, or other such purposes such as maintaining item substitution information which indicates item substitutes that may be utilized during fulfillment of an item should said item not be available. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    presenting, by a computer system, a user interface that includes a plurality of user interface elements, a user interface element of the plurality of user interface elements corresponding to item information for an item presented in a first area of the user interface, a portion of the plurality of user interface elements corresponding to one or more recommended items presented in a second area of the user interface, the plurality of user interface elements being presented in response to an item query submitted via the user interface, the one or more recommended items generated based at least in part on one or more policies, the one or more policies including vendor specific rules and payment authorization rules;
    receiving, by the computer system and via the user interface, first input about an interaction with a particular user interface element of the portion of the user interface elements, the particular user interface element associated with a particular item of the one or more recommended items;
    updating, by the computer system, the particular user interface element to present one or more features including a swap feature in response to the first input;
    receiving, by the computer system and via the user interface, an interaction with the swap feature of the particular user interface element;
    updating, by the computer system, the user interface to present one or more substitute features in response to receiving the interaction with the swap feature, the one or more substitute features including at least a substitute with best available feature, the substitute with best available feature generated by the computer system based at least in part on the particular item and one or more of past transactions of a user interacting with the user interface, preferences of the user, or aggregate information from a plurality of users interacting with an online marketplace associated with the items presented via the user interface;
    receiving, by the computer system and via the user interface, second input about an interaction with the swap feature or the one or more substitute features;
    updating, by the computer system, the first area of the user interface to present the particular item and updated item information for the particular item in response to receiving the second input about the interaction;
    updating, by the computer system, the second area of the user interface to present an updated portion of the user interface elements that correspond to a different set of recommended items in response to receiving the interaction; and
    updating, by the computer system, the user interface to indicate that the particular item has been added to a checkout cart user interface element.

2. The computer-implemented method of claim 1, wherein the different set of recommended items is based at least in part on the particular item.

3. The computer-implemented method of claim 1, wherein the one or more features includes a substitute feature for automatically substituting the particular item for the item.

4. The computer-implemented method of claim 1, wherein the one or more features includes an add-to-cart feature that automatically adds the particular item to the checkout cart user interface element.

5. The computer-implemented method of claim 1, further comprising:
    transitioning, by the computer system, from the user interface to a post-checkout user interface in response to second input;
    presenting, by the computer system, the swap feature for the plurality of user interface elements that correspond to the one or more recommended items presented in the post-checkout user interface; and
    in response to third input received via the post-checkout user interface, replacing, by the computer system, an individual item of the checkout cart user interface element of the post-checkout user interface with another item, the another item included in the one or more recommended items and corresponding to the swap feature of a user interface element of the plurality of user interface elements of the post-checkout user interface.

6. A computer-readable storage medium storing computer-executable instructions that, when executed by a computer system, configure the computer system to perform operations comprising:

presenting a user interface that includes a plurality of user interface elements, a user interface element of the plurality of user interface elements corresponding to item information for an item presented in a first area of the user interface, a portion of the plurality of user interface elements corresponding to one or more recommended items presented in a second area of the user interface, the one or more recommended items generated based at least in part on one or more policies, the one or more policies including vendor specific rules and payment authorization rules;

receiving, via the user interface, a first interaction with a swap feature associated with a particular user interface element of the portion of the user interface elements, the particular user interface element associated with a particular item of the one or more recommended items;

updating the particular user interface element to present the swap feature and one or more substitute features in response to receiving the first interaction with the swap feature, the one or more substitute features including at least a substitute with best available feature, the substitute with best available feature generated by the computer system based at least in part on the particular item and one or more of past transactions of a user interacting with the user interface, preferences of the user, or aggregate information from a plurality of users interacting with an online marketplace associated with the item presented via the user interface;

updating the first area of the user interface to present the particular item and the item information for the particular item in response to receiving the first interaction;

updating the second area of the user interface to present an updated portion of the user interface elements that correspond to a different set of recommended items in response to receiving the first interaction; and updating the user interface to indicate that the particular item has been added to a checkout cart user interface element.

7. The computer-readable storage medium of claim 6, wherein the operations further comprise updating the particular user interface element to present one or more features including the swap feature, a substitution feature, or an add to cart feature in response to the first interaction.

8. The computer-readable storage medium of claim 6, wherein the operations further comprise:

receiving, via the user interface, a second interaction with the swap feature associated with a different user interface element of the updated portion of the user interface elements, the different user interface element associated with a different item of the different set of recommended items;

updating the first area of the user interface to present the different item and the item information for the different item in response to receiving the second interaction;

updating the second area of the user interface to present the updated portion of the user interface elements that correspond to the different set of recommended items in response to receiving the second interaction; and updating the user interface to indicate that the particular item has been replaced in the checkout cart user interface element with the different item.

9. The computer-readable storage medium of claim 8, wherein the operations further comprise updating a database that maintains mappings of items to substitute items based at least in part on the first interaction and the second interaction.

10. The computer-readable storage medium of claim 8, wherein the operations further comprise updating the user interface to indicate that the particular item is designated as a substitute item for the different item.

11. The computer-readable storage medium of claim 6, wherein an individual user interface element of the portion of user interface elements includes a combination of recommended items of the one or more recommended items.

12. The computer-readable storage medium of claim 6, wherein the operations further comprise generating the one or more recommended items and the different set of recommended items based at least in part on one or more policies.

13. The computer-readable storage medium of claim 6, wherein the operations further comprise generating the one or more recommended items and the different set of recommended items based at least in part on availability information associated with the one or more recommended items.

14. A computer system comprising:

a memory configured to store computer-executable instructions; and a processor in communication with the memory configured to execute the computer-executable instructions to at least:

present a user interface that includes a plurality of user interface elements, a user interface element of the plurality of user interface elements corresponding to item information for an item presented in a first area of the user interface, a portion of the plurality of user interface elements corresponding to one or more recommended items presented in a second area of the user interface, the one or more recommended items generated based at least in part on one or more policies, the one or more policies including vendor specific rules and payment authorization rules;

receive, via the user interface, an interaction with a swap feature associated with a particular user interface element of the portion of the user interface elements, the particular user interface element associated with a particular item of the one or more recommended items;

in response to receiving the interaction:

update the particular user interface element to present the swap feature and one or more substitute features in response to receiving the interaction with the swap feature, the one or more substitute features including at least a substitute with best available feature, the substitute with best available feature generated by the computer system based at least in part on the particular item and one or more of past transactions of a user interacting with the user interface, preferences of the user, or aggregate information from a plurality of users interacting with an online marketplace associated with the item presented via the user interface;

update the first area of the user interface to present the particular item and the item information for the particular item;

update the second area of the user interface to present an updated portion of the user interface elements that correspond to a different set of recommended items;

update a third area of the user interface to indicate that the item is a substitute item associated with the particular item; and
update the user interface to indicate that the particular item has been added to a checkout cart user interface element.

15. The computer system of claim 14, wherein the processor is further configured to:
receive, from a user device, information indicating that the particular item is unavailable; and
transmit, to the use device, instructions to substitute the item as the substitute item in response to receiving the information.

16. The computer system of claim 14, wherein the processor is further configured to modify an individual user interface element of the portion of user interface elements to indicate certain information.

17. The computer system of claim 14, wherein the processor is further configured to modify an individual user interface element of the portion of user interface elements based at least in part on a user profile of a user associated with the interaction.

18. The computer system of claim 14, wherein the processor is further configured to modify an individual user interface element of the portion of user interface elements based at least in part on historical transaction information associated with the one or more recommended items.

19. The computer system of claim 14, wherein the processor is further configured to update a database that maintains mappings of items to substitute items based at least in part on the interaction.

20. The computer system of claim 14, wherein the processor is further configured to generate the one or more recommended items and the different set of recommended items based at least in part on one or more policies.

* * * * *